United States Patent
Yeh

(10) Patent No.: US 7,209,809 B2
(45) Date of Patent: Apr. 24, 2007

(54) METHOD AND APPARATUS FOR OBTAINING HIGH INTEGRITY AND AVAILABILITY IN MULTI-CHANNEL SYSTEMS

(75) Inventor: Ying Chin Yeh, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 159 days.

(21) Appl. No.: 10/687,274

(22) Filed: Oct. 15, 2003

(65) Prior Publication Data
US 2005/0085957 A1    Apr. 21, 2005

(51) Int. Cl.
G06F 19/00    (2006.01)

(52) U.S. Cl. ............... 701/3; 701/297; 714/6; 714/11; 714/21; 714/36

(58) Field of Classification Search .............. 244/75 R, 244/195, 75 A, 76 C, 194, 221; 701/3, 29; 371/9, 68; 714/6, 36, 11, 12, 21, 10; 702/199
See application file for complete search history.

(56) References Cited

U.S. PATENT DOCUMENTS

| | | | |
|---|---|---|---|
| 4,471,481 A | | 9/1984 | Shaw et al. |
| 4,524,449 A | * | 6/1985 | Colling ................ 377/28 |
| 4,622,667 A | * | 11/1986 | Yount ................... 714/11 |
| 4,698,785 A | * | 10/1987 | Desmond et al. ........ 714/38 |
| 4,967,347 A | * | 10/1990 | Smith et al. ........... 714/12 |
| 5,233,542 A | * | 8/1993 | Hohner et al. .......... 702/199 |
| 5,493,497 A | | 2/1996 | Buus |
| 5,515,282 A | | 5/1996 | Jackson |
| 5,670,856 A | * | 9/1997 | Le et al. .............. 318/564 |
| 5,710,776 A | | 1/1998 | Tomlinson et al. |
| 5,802,077 A | | 9/1998 | Yeh |
| 6,141,769 A | * | 10/2000 | Petivan et al. ......... 714/10 |
| 6,141,770 A | * | 10/2000 | Fuchs et al. ........... 714/11 |
| 6,443,399 B1 | * | 9/2002 | Yount et al. .......... 244/196 |
| 6,871,127 B1 | * | 3/2005 | Dominke et al. ......... 701/43 |
| 7,017,861 B1 | * | 3/2006 | Johansson et al. ....... 244/194 |
| 7,092,354 B1 | * | 8/2006 | Jensen ................. 370/218 |
| 2002/0133744 A1 | * | 9/2002 | Oldfield et al. .......... 714/11 |
| 2003/0127569 A1 | * | 7/2003 | Bacon et al. .......... 244/195 |
| 2004/0019822 A1 | * | 1/2004 | Knapp, III ............. 714/6 |
| 2004/0098140 A1 | * | 5/2004 | Hess ................... 700/3 |

OTHER PUBLICATIONS

Yeh, Ying. C., "Dependability of the Boeing 777 Flight Control System", Fifth IFIP Conference on Dependable Computing for Critical Application, DCCA-5, University of Illinois, Urbana-hampagne, Illinois, Sep. 27-29, 1995, pp. 4-17.

* cited by examiner

Primary Examiner—Tuan C To
(74) Attorney, Agent, or Firm—Lee & Hayes, PLLC

(57) ABSTRACT

Systems and methods for asynchronous multi-channel data communications are provided. An embodiment of the invention includes a minimum of three channels for digital computation in Primary Flight Computers and four channels for digital/analog conversion in Actuation Control Electronics. Each channel (Primary Flight Computer or Actuation Control Electronics) contains two computation lanes with dissimilar processors and compilers. Hence with dual-dissimilar processors the computer architecture is fail-passive to generic errors. The two Actuation Control Electronics computation lanes select the digital control data of one of the two computation lanes of one of the three digital computation channels for conversion and transmission to associated actuators.

6 Claims, 12 Drawing Sheets

METHOD AND APPARATUS FOR OBTAINING HIGH INTEGRITY AND AVAILABILITY IN MULTI-CHANNEL SYSTEMS

FIELD OF THE INVENTION

This invention relates generally to multi-channel systems and, more specifically, to fault tolerance in multi-channel systems.

BACKGROUND OF THE INVENTION

Prior to the advent of fly-by-wire technology, flight control surfaces on a commercial aircraft were controlled using a complex system of cables and mechanical controls. Since the advent of fly-by-wire technology, such mechanical control systems were replaced with systems having no direct mechanical couplings between pilot controls and flight control surfaces. Instead of using mechanical couplings such as cables, a fly-by-wire system including pilot control transducers senses the position of the pilot controls and generates electrical signals proportional to the position of the pilot controls. The electrical signals are combined with other airplane data in a primary flight computer to produce a flight control surface command that controls movement of the flight control surfaces of the aircraft.

Because safety is always a high priority in the aircraft industry, a fly-by-wire system usually includes redundant components so that if one component of the system fails, a pilot can still safely control the aircraft. An example of such a fly-by-wire system is described in commonly assigned U.S. patent application Ser. No. 07/893,339, entitled Multi-Access Redundant Fly-By-Wire Primary Flight Control System, to Buus, filed Jun. 3, 1992, the disclosure and drawings of which are specifically incorporated herein by reference. The described fly-by-wire system is divided into a series of independent control channels wherein each control channel within the system is substantially isolated from the other control channels. Consequently, a data error value occurring in one channel does not affect the continued operation of the remaining channels such that a pilot can fly the aircraft using only one channel.

This example of a fly-by-wire system includes many other redundant systems to ensure the continuous smooth operation during flight. For example, this system includes autopilot flight director computers, air data modules, engine indication and crew alerting systems, airplane information management systems, etc. The independent control channels are in direct communication with these aircraft systems via a global communications data bus. However, each component of the fly-by-wire system, including the global communication data bus, may represent a potentially weak link that might introduce a problem in the event of failure of that component or in the event of a broken or loose connection to that component.

To this end, fly-by-wire architectures for the Boeing 777 have been developed with an asynchronous multi-channel system (that includes a minimum of three channels with a minimum of three computation lanes in each channel) as the host to serve as guardian of common communication media. Three computation lanes in each channel employ dissimilar processors and compilers so that the computer architecture is fail-operational to generic errors. However, these systems are expensive because of their reliance on hardware solutions.

Consequently, there is a need to provide fly-by-wire systems with the ability to monitor and identify failures or faults in aircraft components efficiently and economically.

SUMMARY OF THE INVENTION

Systems and methods for asynchronous multi-channel data communications are provided. An embodiment of the invention includes a minimum of three channels for digital computation and four channels for digital/analog conversion. Each channel contains two computation lanes with dissimilar processors and compilers. With dual-dissimilar processors the computer architecture is fail-passive to generic errors.

The present invention includes algorithms, implemented in software installed in each digital computation channel (called a Primary Flight Computer) and each digital/analog conversion channel (called Actuation Control Electronics).

In accordance with one aspect of the present invention, the two computation lanes of the Actuation Control Electronics select the digital control data of one of the digital computation channels of the Primary Flight Computers for conversion and transmission to associated actuators.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
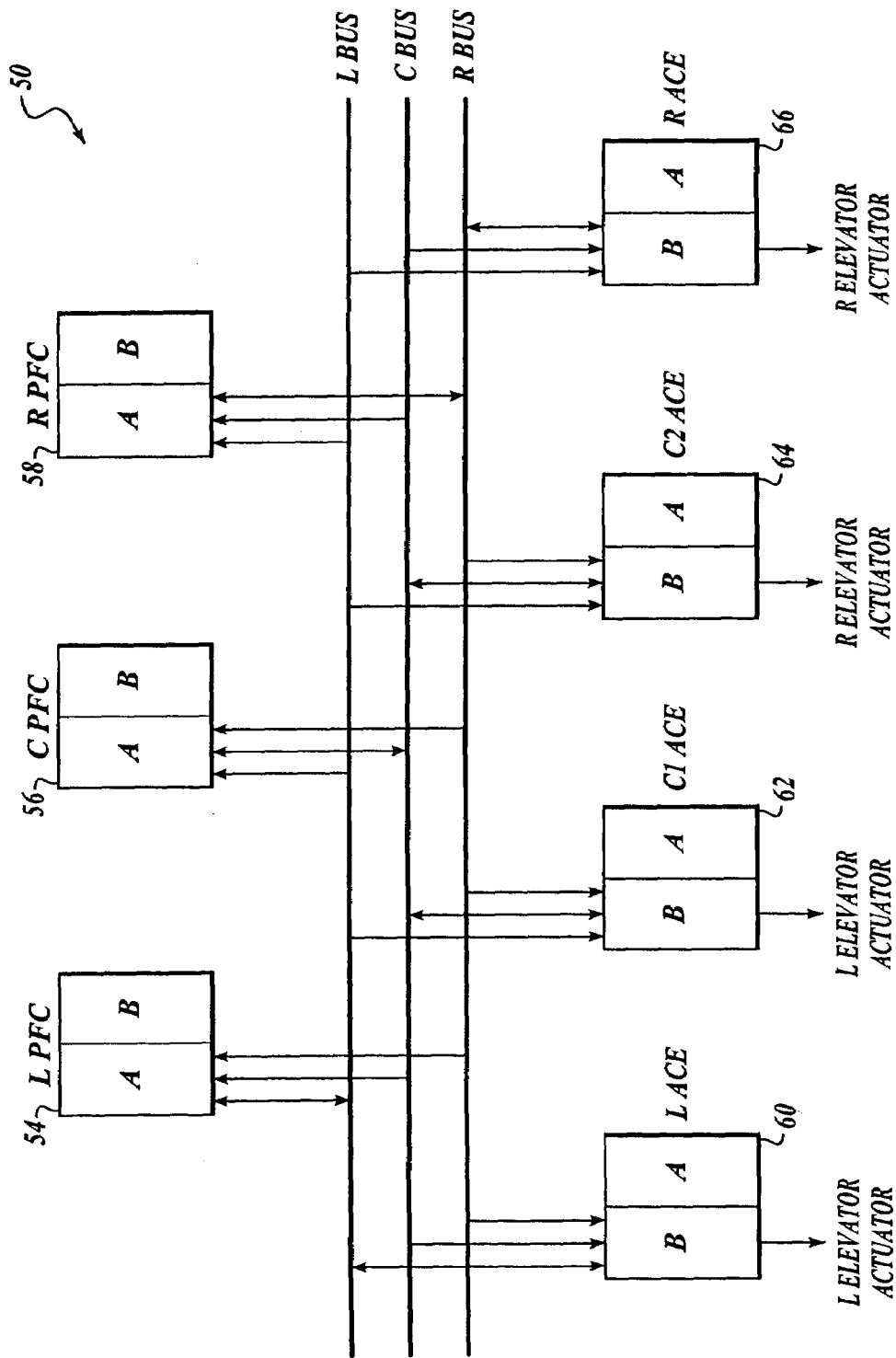
FIG. 1 is a block diagram of an exemplary system formed in accordance with the present invention.

As shown in FIG. 1, an embodiment of the present invention includes a system 50 having at least two PFCs 54–58 and at least three actuation control electronics line replaceable units (LRU) (hereinafter ACE) 60–66. Each of the PFCs 54–58 and ACEs 60–66 include dual-dissimilar self-monitoring processing lanes A and B. Each lane is a separate computer system. Each pair of dissimilar lanes A and B in each of the PFCs 54–58 and ACEs 60–66 is synchronized. However, the lanes A and B between different PFCs and ACEs may be asynchronous.

Figure 2:
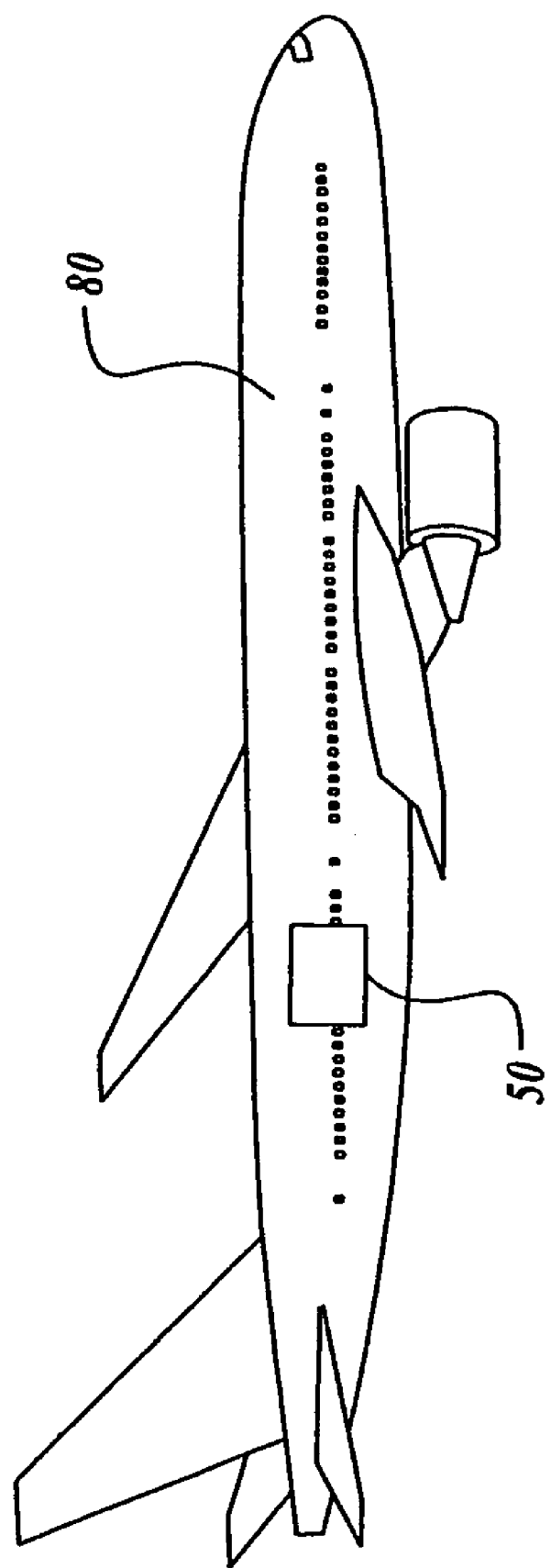
FIG. 2 is a perspective view of an aircraft that includes the system shown in FIG. 1.

The ACEs 60–66 monitor the lane A and B outputs of the PFCs 54–58 and inhibit PFCs if the monitoring indicates persistent PFC errors. As shown in FIG. 2, an airplane 80 embodying the system 50 includes two elevator actuators on each of the left and right elevator control surfaces. The ACEs 60–66 are matched on a one-to-one basis with the four elevator actuators. It will be appreciated that if the airplane 50 is designed with three elevator actuators, then the system 50 will include three ACEs. The system 50 also includes global data buses L, C, and R that are used for communication between the PFCs 54–58, the ACEs 60–66, and other LRUs (not shown).

Figure 3:
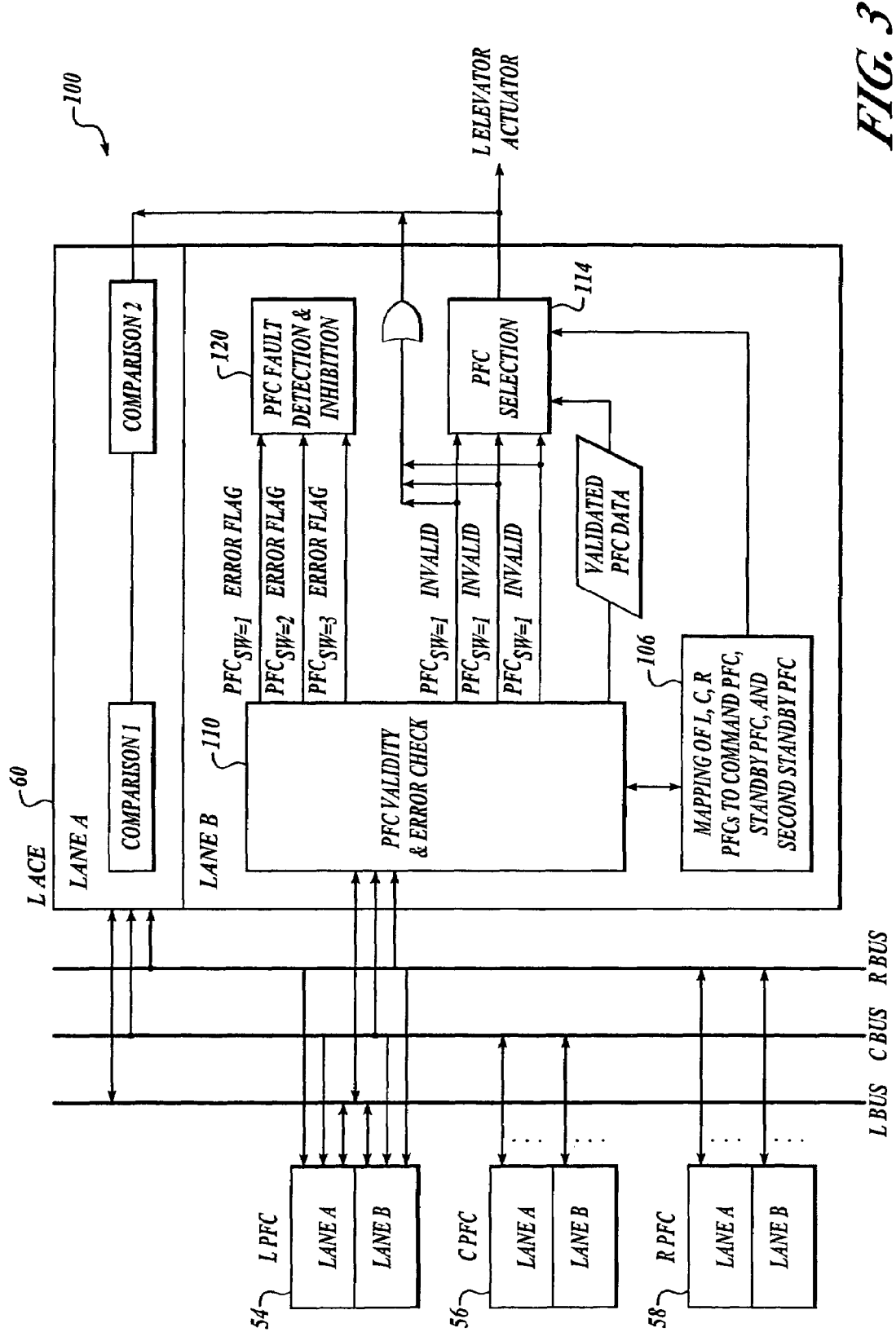
FIG. 3 is a high level logic block diagram of exemplary logic processing performed by an embodiment of the present invention.

Referring now to FIG. 3, an exemplary logic process 100 implemented in software for performing fault detection and data use of the system 50 as performed at each of the ACEs 60–66 is shown. At a block 106, the logic process 100 determines the mapping of the L, C, and R PFCs 54–58 into their proper roles: command; standby; and second standby. Mapping of the roles is illustrated in more detail below with respect to FIG. 4. At a block 110, a PFC validity and error check is performed based on the mapping performed at the block 106. The PFC validity and error check is described in more detail below with respect to FIG. 5. At a block 114, selection of the PFC data of one of the PFCs 54–58 is performed. The selected PFC data will be converted from a digital format to analog format and sent to the associated elevator actuator. The method of selection of the PFC data is described in more detail below with respect to FIG. 7.

At a block 120, the process 100 performs PFC fault detection and inhibition based on the results of the PFC validity and error check performed at the block 110. PFC fault detection and inhibition is described in more detail below with respect to FIGS. 8–12. PFC fault detection and inhibition detects any faults produced by the PFCs and inhibits a PFC according to detected faults.

The logic process 100 is performed in lane B of each of the ACEs 60–66. In the ACEs 60–66, lane B is the command lane and lane A is the monitor lane. The monitor lane A of each of the ACEs 60–66 compares the data received to that received by the command lane B. This comparison or self-monitoring checks to ensure that command data produced by both lanes of each ACE and data received from PFCs by both lanes of each ACE are within certain threshold limits of each other.

Lane A of the ACEs 60–66 includes a Comparison 1 block that performs the same steps as shown in Lane B. Comparison 2 compares the result of Lane B to Lane A. The compared results may be stored for later use.

Figure 4:
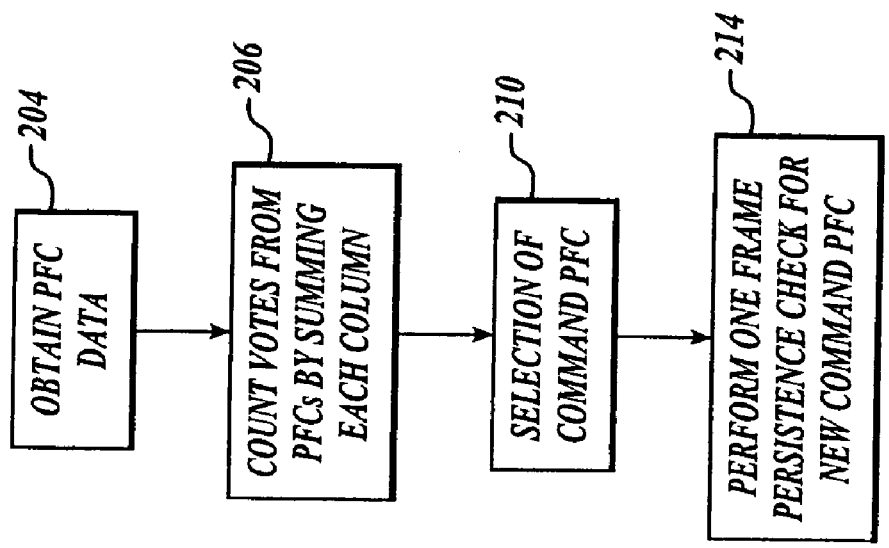
FIG. 4 is a flow chart of an exemplary mapping routine performed by an embodiment of the present invention.

Referring now to FIG. 4, an exemplary process 200 for performing the mapping of the PFCs 54–58 is illustrated. At a block 204, the data from the command lanes (lanes A) of each of the PFCs 54–58 is obtained. The obtained PFC data includes a PFC declaration of which PFC is the command PFC. Each PFC 54–58 stores a declaration that identifies which of the three PFCs 54–58 is the command PFC. Exemplary declaration information is as follows:

(1,0,0)=Declaration of L PFC as Command
(0,1,0)=Declaration of C PFC as Command
(0,0,1)=Declaration of R PFC as Command At a block 206, all the declarations or votes for command PFC included within the received declarations are added. The number of votes that identify the L PFC 54 as the command channel is identified as $a_1$. The number of votes for the C PFC 56 as the command channel is identified as $a_2$. The number of votes for the R PFC 58 as the command channel is identified as $a_3$.

At a block 210, selection of the command PFC is performed. An exemplary selection of the command PFC is as follows:

At initialization:

```
    OLD Selection = L PFC
    NEW (Pre-last) = L PFC
    NEW (last) = L PFC
At Normal Operation
    If a₁ ≥ a₂ Then
        If a₁ ≥ a₃ Then
```

-continued

```
            NEW(last) = L PFC (Note 1)
        Else
            NEW(last) = R PFC (Note 3)
    Else If a₂ ≥ a₃ Then
        NEW(last) = C PFC (Note 2)
    Else
        NEW(last) = R PFC
Note 1: L PFC mapped to PFC sw=1
        C PFC mapped to PFC sw=2
        R PFC mapped to PFC sw=3
Note 2: C PFC mapped to PFC sw=1
        R PFC mapped to PFC sw=2
        L PFC mapped to PFC sw=3
Note 3: R PFC mapped to PFC sw=1
        L PFC mapped to PFC sw=2
        C PFC mapped to PFC sw=3
```

At a block 214, an exemplary frame persistence check is performed as follows:

At initialization:

```
    COMMAND PFC = L PFC
At Normal operation, block 214:
    If NEW(last) = NEW (pre-last)
        COMMAND PFC = NEW (last)
        OLD Selection = NEW (pre-last)
    Else
        COMMAND PFC=OLD Selection
        NEW(pre-last)=NEW(last)
```

Figure 5:
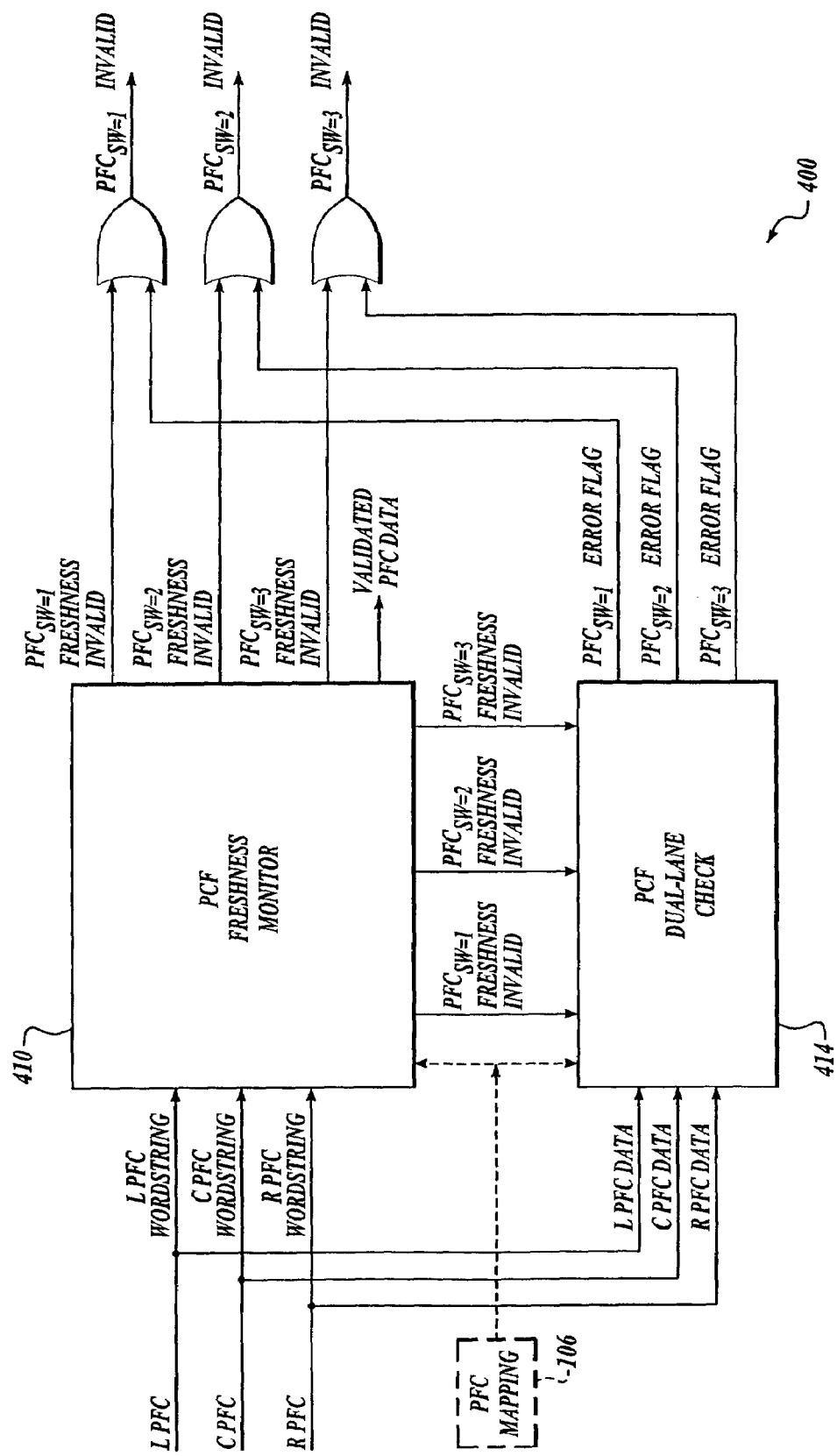
FIGS. 5–12 are logic block diagrams illustrating logic processing performed by the system shown in FIG. 1.

Referring now to FIG. 5, a logic process 400 that is performed at the block 110 (FIG. 3) is illustrated. A block 410 determines freshness invalid signals for the command (sw=1), stand-by (sw=2), and second stand-by (sw=3) PFCs based on how the PFCs 54–58 are mapped as determined at the block 106 (FIG. 3) and wordstrings received from the L PFC 54, the C PFC 56, and the R PFC 58. Wordstrings are strings of consecutive data words, usually ending with a checkword, e.g. cyclic redundant checkword (CRC).

A block 414 performs a dual lane check for each of the PFCs 54–58 based on the mapping performed at the block 106 (FIG. 3), the freshness invalid signals generated by the block 410, and data received from the L, C, and R PFCs 54–58. The PFC dual lane check is described in more detail below with regards to FIG. 6. The results of the PFC dual lane check include an enabled or disabled error flag for each of the PFCs 54–58. The process 400 ORs the generated error flag with the corresponding freshness invalid signal to produce an invalidity indication for the respective PFC. The freshness invalid signal is generated for each lane of each PFC.

Figure 6:
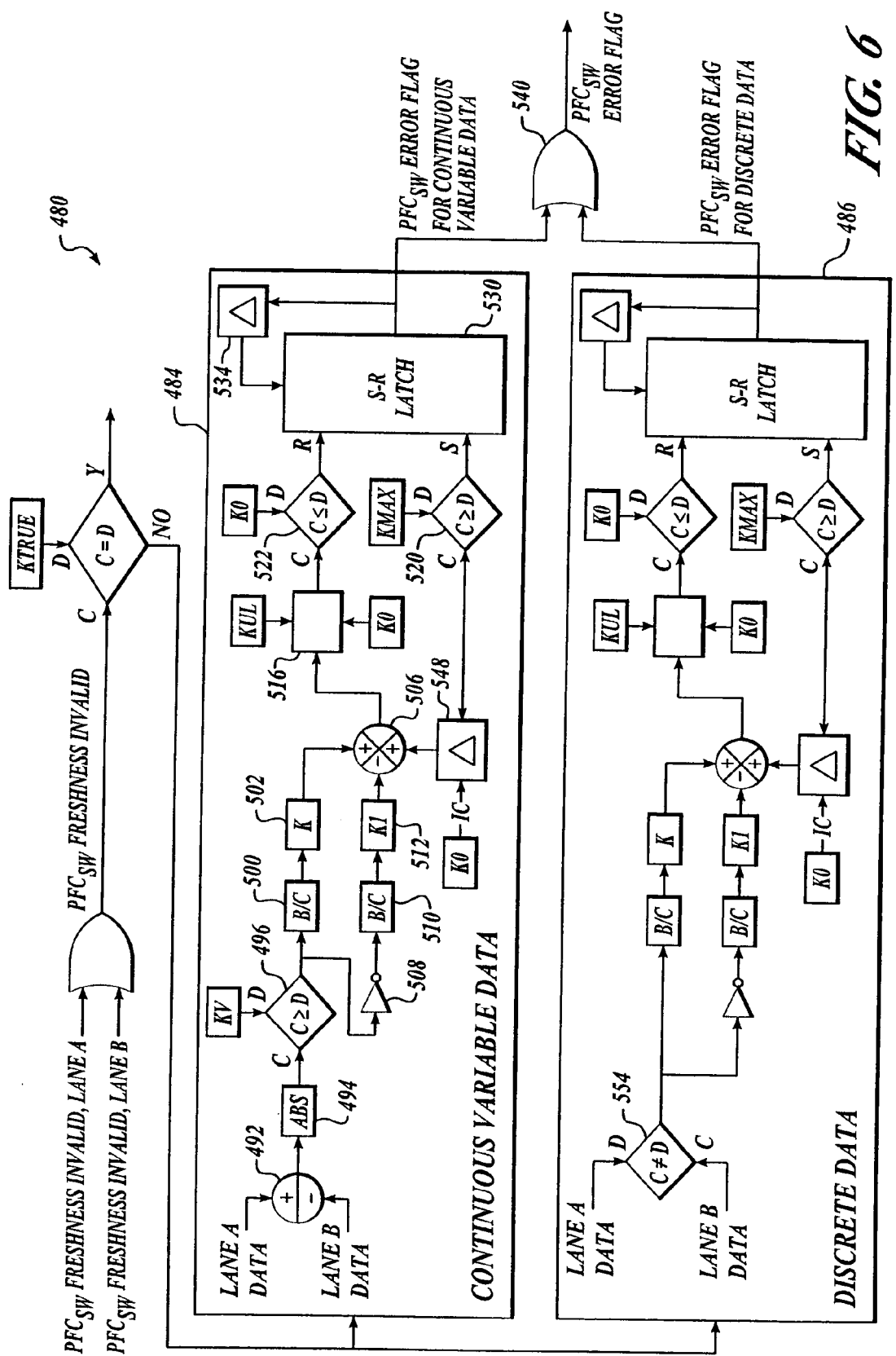

Referring now to FIG. 6, a logic process 480 is performed as shown at the block 414 (FIG. 5). For each PFC 54–58, freshness invalid signals for both lanes, as received from the block 410 (FIG. 5), are OR'd together to produce a freshness invalid signal for the respective PFC, which if false will cause the process 480 to determine the present error flag value. Otherwise, the initial error flag value remains the same.

A block 484 determines if an error flag should be asserted with respect to continuous variable data that is produced by the command lane of the PFC. A block 486 determines if an error flag is to be set for discrete data produced by the command lane of a PFC. Referring to the block 484, the continuous variable data from the monitor lane B of a PFC is subtracted from the continuous variable data from the command lane A at a block 492. The absolute value of the result of the block 492 is taken at a block 494 and is compared at a comparison block 496 to an acceptable tolerance threshold $K_v$ between the data produced by the two PFC lanes. The comparison between the absolute value of the difference and $K_v$ is true if the absolute value of the difference is greater than or equal to $K_v$, and false if the absolute value of the difference is less than $K_v$. At a gain block 502, a constant value is multiplied by the result of the block 500. The result of the gain block 502 is a positive entry into a summation block 506. In addition, the true or false result of the comparison block 496 is inverted at an inverter 508. The result of the inverter 508, either true or false, is converted at a Boolean-to-continuous conversion block 510 to 1 or 0, respectively. If the input of either of the Boolean-to-continuous conversion blocks 500 and 510 is true, then the output equals one else the output equals zero. At a gain block 512, the result of the Boolean-to-continuous conversion block 510 is multiplied by a $K_{one}$ value. The result of the block 512 is a subtraction within the summation block 506.

The result of the summation block 506 is compared to minimum and maximum limits at a comparator 516. The minimum and maximum limits are predefined limits. If the output of the summation block 506 is less than the minimum limit, then the output of the comparator 516 equals the minimum limit. If the input to the comparator 516 is greater than the maximum limit, then the output of the comparator 516 is made equal to the maximum limit. If the input to the comparator 516 is somewhere between the minimum and maximum limits, the output is made the same as the input. During normal operation, the output of the comparator 516 is fed back in as a positive value into the summation block 506 after a predefined delay at a delay block 548. If the summation block 506 is occurring at initialization of the process 484, an initialization constant value $K_o$ is used in place of the last value generated by the comparator 516.

At a decision block 520, the result of the comparator 516 is checked to determine if it is greater than or equal to a maximum constant value $K_{max}$. If the decision block 520 determines that the condition is true, then a true value is asserted to a S-R latch 530. A decision block 522 determines if the result of the comparator 516 is less than or equal to constant value $K_o$. The decision block 522 produces a true result if the result of the comparator 516 is zero or less. If a true value resulting from the decision block 522 is asserted to the S-R latch 530, the S-R latch 530 resets any previously asserted true condition that is the result of the decision block 520. Thus, what is occurring at the decision blocks 520 and 522, and the S-R latch 530, is a setting of a fault condition. The set fault condition does not reset until re-initialization of the process 480 or the value fed into the comparator 516 drops down to or below the minimum value of $K_o$. The output of the S-R latch 530 is saved in a time delay mechanism 534 that is reconnected to the S-R latch 530 in order to save the value produced by the S-R latch 530, whether that value is a one or a zero. The S-R latch 530 produces a zero value, if the result of the decision block 520 is false or the result of the decision block 522 is true. The result produced by the S-R latch 530 is also sent through an OR gate 540. The OR gate 540 also receives input from a discrete data process in the block 486.

With regards to the discrete data process shown in the block 486, if discrete data is received at an ACE from lanes A and B of a PFC, the lane A discrete data is compared at a decision block 554 to determine if it is true that the lane A discrete data is not equal to the lane B discrete data. The result of the decision block 554 is then processed to determine if an error flag is set. After the decision block 554, the steps are similar to those set forth in the continuous variable data process performed at the block 484, except for some of the constant values used. Therefore, if either one of the processes in blocks 484 or 486 generate a one signal or, in other words, assert that the differences between the lanes A and B data are outside of a threshold limit experienced over a period of time, then an error flag is set at the OR gate 540 for that particular PFC. Because there are three PFCs, the process 480 is performed for each PFC 54–58 within each ACE 60–66 (FIG. 3).

Referring back to FIG. 5, the results of the block 414 are OR'd respectively with freshness invalid signals produced by the PFC freshness monitor block 410. This produces an invalid signal for any one of the PFCs if either the corresponding freshness invalid signal or error flag is set. Thus, the outputs of the PFC validity and error check at the block 110 (FIG. 3) are invalid signals for each of the PFCs and an error flag for each of the PFCs.

Figure 7:
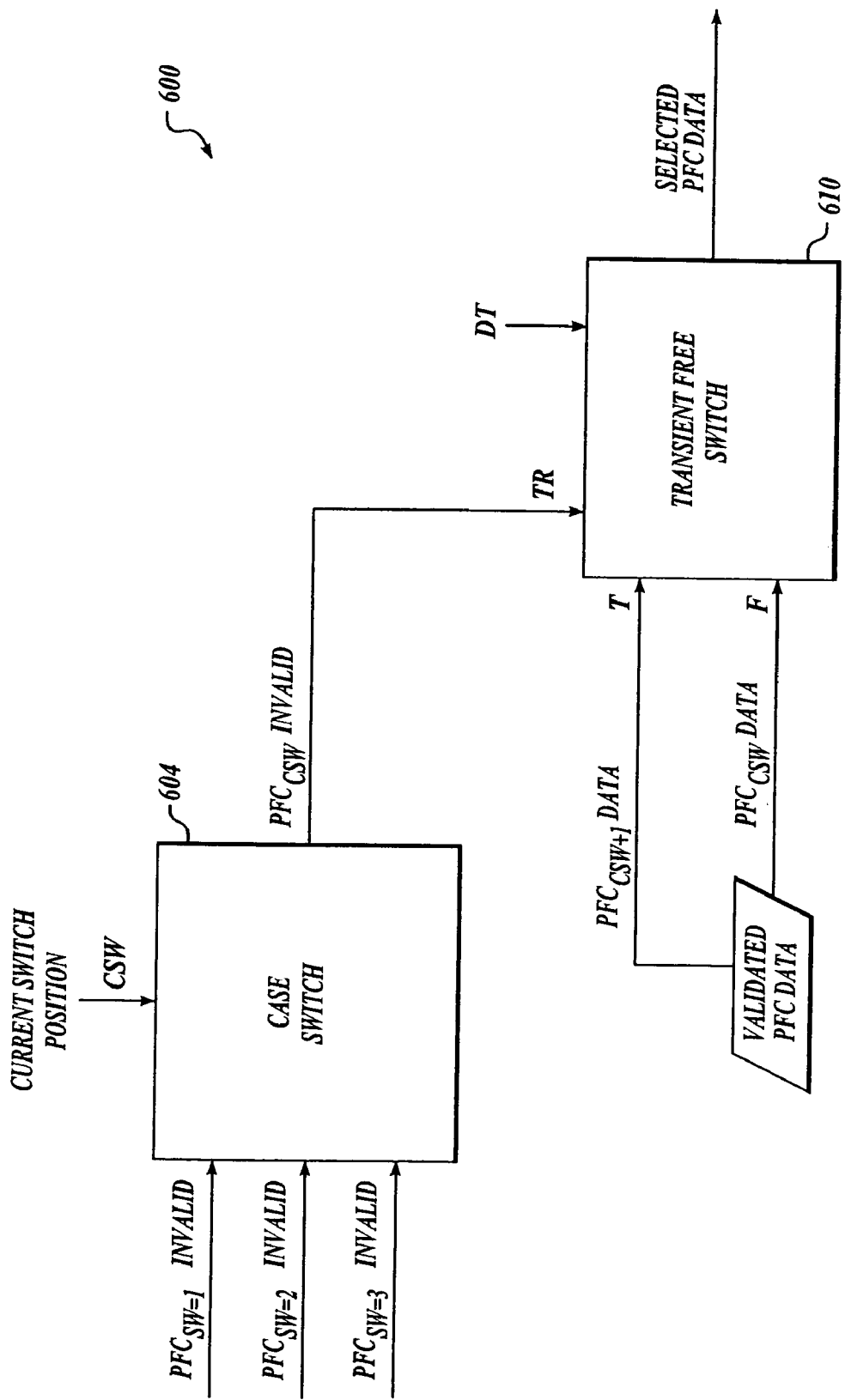

Referring now to FIG. 7, a logic process 600 for performing the PFC selection as performed at the block 114 (FIG. 3) is shown. At a case switch 604, the invalid signals generated by the PFC validity and error check block 110 (FIG. 3) are received and outputted based on a PFC selection. During normal operation, if the PFC selection is equal to one, the output of the case switch 604 equals the PFC invalid signal at the first input (sw=1), else if the PFC selection is equal to two, the output of the case switch 604 is equal to the PFC invalid signal at input two (sw=2), else if the PFC selection is equal to three, then the output of the case switch 604 is equal to the PFC invalid signal at input three (sw=3).

The transient free switch 610 performs a data smoothing process between the last good data received from a PFC that has just been determined invalid and the PFC that is going to take over. Exemplary operation of the transient free switch 610 is as follows:

```
If (TR = FALSE)
    Output = F
Else If (TR Transition from FALSE to TRUE)
    Output = Output + (T-Output) /DT/CT
Note: Guidelines for defining Transition Time DT are:
    1.  DT is a positive number
    2.  DT is converted to an integer multiple of cycle time (CT)
    3.  At the end of DT, CSW=CSW+1
```

The result of the transient free switch 610 is either one of discrete or continuous variable data depending upon what is initially received from the PFCs that is outputted to the actuator associated with the ACE that performed the PFC selection.

Figure 8:
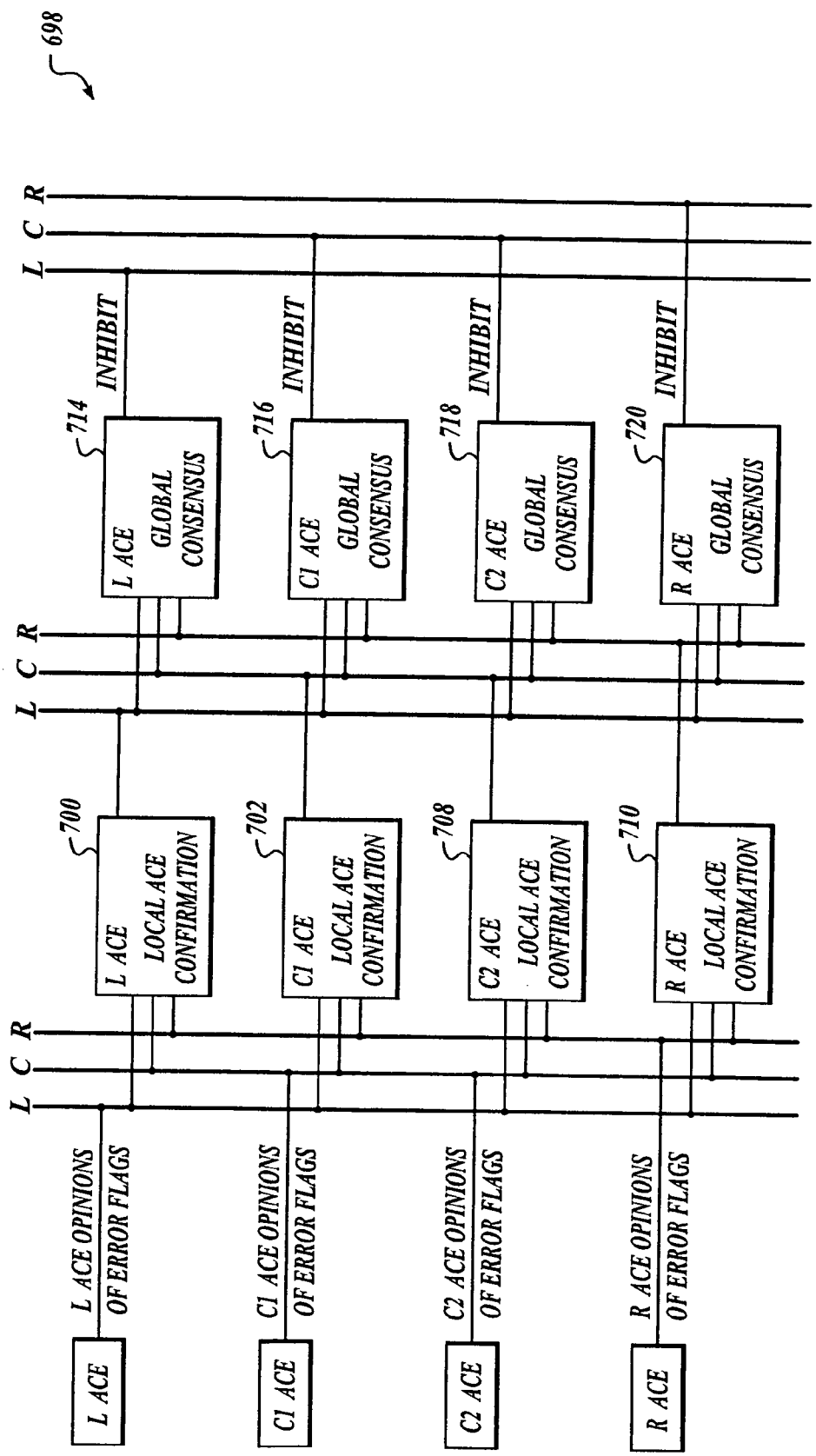

Referring now to FIG. 8, a PFC fault detection and inhibit function 698 that is performed at the block 120 (FIG. 3) is shown. Local ACE confirmations are performed at blocks 700–710 based on local ACE opinions (i.e., PFC error flags) and global consensus steps are performed at each of the ACEs at blocks 714–720.

Figure 9:
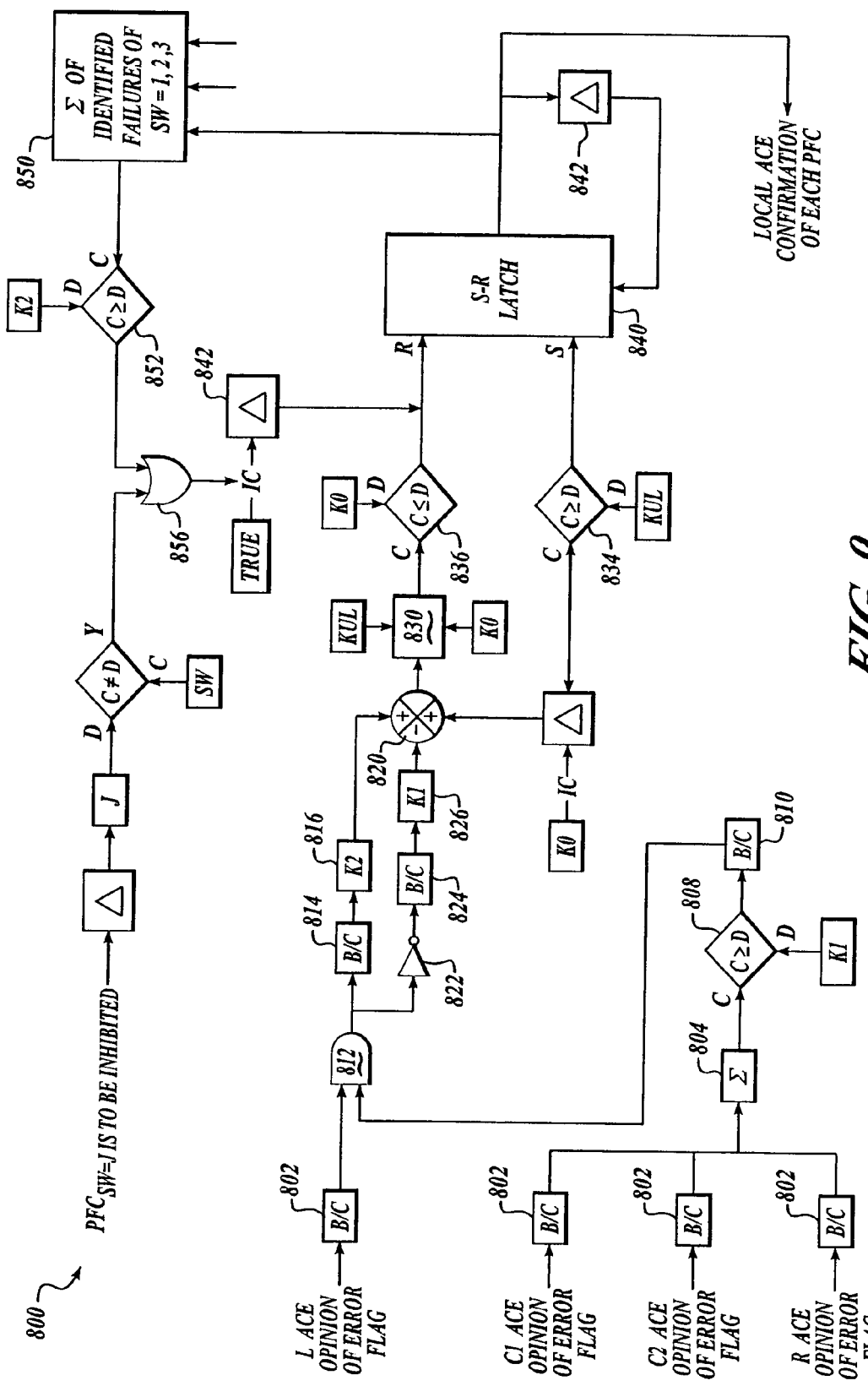
Figure 10:
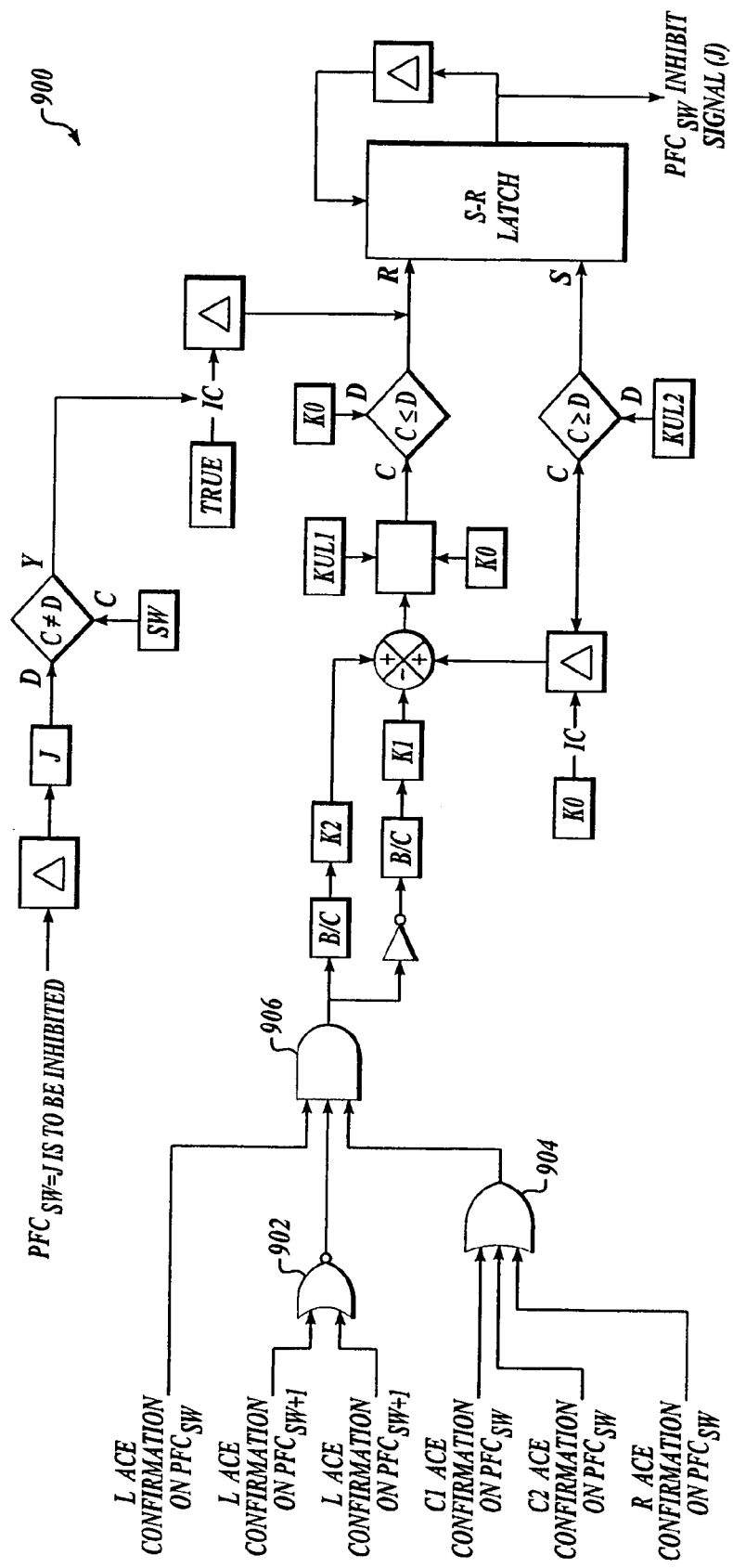

Referring now to FIGS. 9 and 10, a local ACE confirmation logic process 800 and a global ACE consensus logic process 900, respectively, are shown for an embodiment where all four of the ACEs are located in physically separate cabinets with separate power supplies. The local ACE confirmation process 800 is the same process for all ACEs except that a beginning portion of each process 800 depends upon the ACE that is performing the process 800. The local ACE confirmation process 800 first converts all the opinions from each of the ACEs for a particular PFC from Boolean-to-continuous values through Boolean-to-continuous B/C blocks 802. The converted results of the opinions from the other ACEs, C1, C2, and R, (if the process 800 is being performed in the L ACE), are added at a summation block 804. The result of the summation block 804 is compared to a constant $K_{one}$ value at a decision block 808. If the result of the summation block 804 is greater than or equal to the constant $K_{one}$ value, then a true signal is asserted by the decision block 808. The true signal is converted by a B/C block 810 and sent to an AND gate 812 along with the converted opinion of the resident ACE, in this case the L ACE. The results of the AND gate 812 are true if the opinion of the L ACE agrees with any one of the opinions from the other ACEs. If the result of the AND gate 812 is true, the result is converted to a continuous 1 value at a B/C block 814 and multiplied by a constant value $K_2$, which equals 2, at a gain block 816, and is then added at a summation step 820. If the result at the AND gate 812 produces a false signal, in other words the L ACE opinion is that the respective PFC did not have an asserted error flag, or the L ACE opinion is that the PFC has an asserted error flag but none of the other ACEs opinions agree with that opinion, the false signal is inverted by an inverter 822 to generate a true signal that is then converted by a B/C block 824 into a continuous one value that is multiplied by constant $K_1$ at a gain block 826. The result of the gain block 826 is subtracted from other values received by the summation block 820. The result of the summation block 820 is compared to lower and upper constant value $K_o$ which equals zero, and $K_u$ at a comparator 830. For example $K_u$ is 16. The process performed by the comparator 830 is similar to the comparator 516 (FIG. 6). The result of the comparator 830 is stored and sent back to the summation step 820 at the next sample time and is also sent to decision blocks 834 and 836. If, at the decision block 834, the result of the comparator 830 is greater than or equal to a constant value $K_{u1}$, then an S is inserted at an S-R latch 840. If at the decision block 836 the result of the comparator 830 is less than or equal to a constant value $K_o$, then an R is asserted into the S-R latch 840, thereby resetting the S-R latch 840, in other words, resetting any previously asserted S. The result of the S-R latch 840 is stored in a storage device 842 and returned to the S-R latch 840 at the next sample period time. The S-R latch 840 produces a confirmed signal that the respective PFC has failed if S was asserted at the S-R latch 840 and the R is not asserted. The process 800 is repeated for each PFC in the L ACE. The process 800 is also repeated in all other ACEs. At a summation block 850, the results of all the S-R latches in the L ACE for each of the PFCs are summed. The result of the summation 850 is sent to a decision block 852 that determines if the result is greater than or equal to a constant value of $K_{two}$, which equals 2 in this embodiment. If it is true that the L ACE has produced confirmed failure on more than one PFC, then the result of the decision block 852 produces a 1 that is sent to an OR gate 856. Also, if a PFC was previously disabled (J), then a 1 is sent to the OR gate 856. If the OR gate 856 produces a 1 signal, then the R on the latch 840 is set, thereby ignoring the S value sent to the latch 840.

Referring now to FIG. 10, a logic process 900 for performing global ACE consensus from the block 714 (FIG. 8) is illustrated. The L ACE's opinion of the PFCs in the stand-by and second stand-by roles are entered into a NOR gate 902. Opinions from each of the other ACEs for the PFC in the command position are OR'd at OR gate 904. The results of the NOR gate 902 and the OR gate 904 are entered into an AND gate 906 with the L ACE's opinion of the command PFC.

The result of the AND gate 906 is processed in a similar manner as the result of the AND gate 812 (FIG. 9). In other words, the result of the global ACE consensus process 900 in the L ACE is to inhibit a PFC if it has been determined that at least one other ACE agrees that the PFC is to be inhibited and the L ACE did not have the same bad opinion about any other PFC with respect to a threshold value over a period of time.

Figure 11:
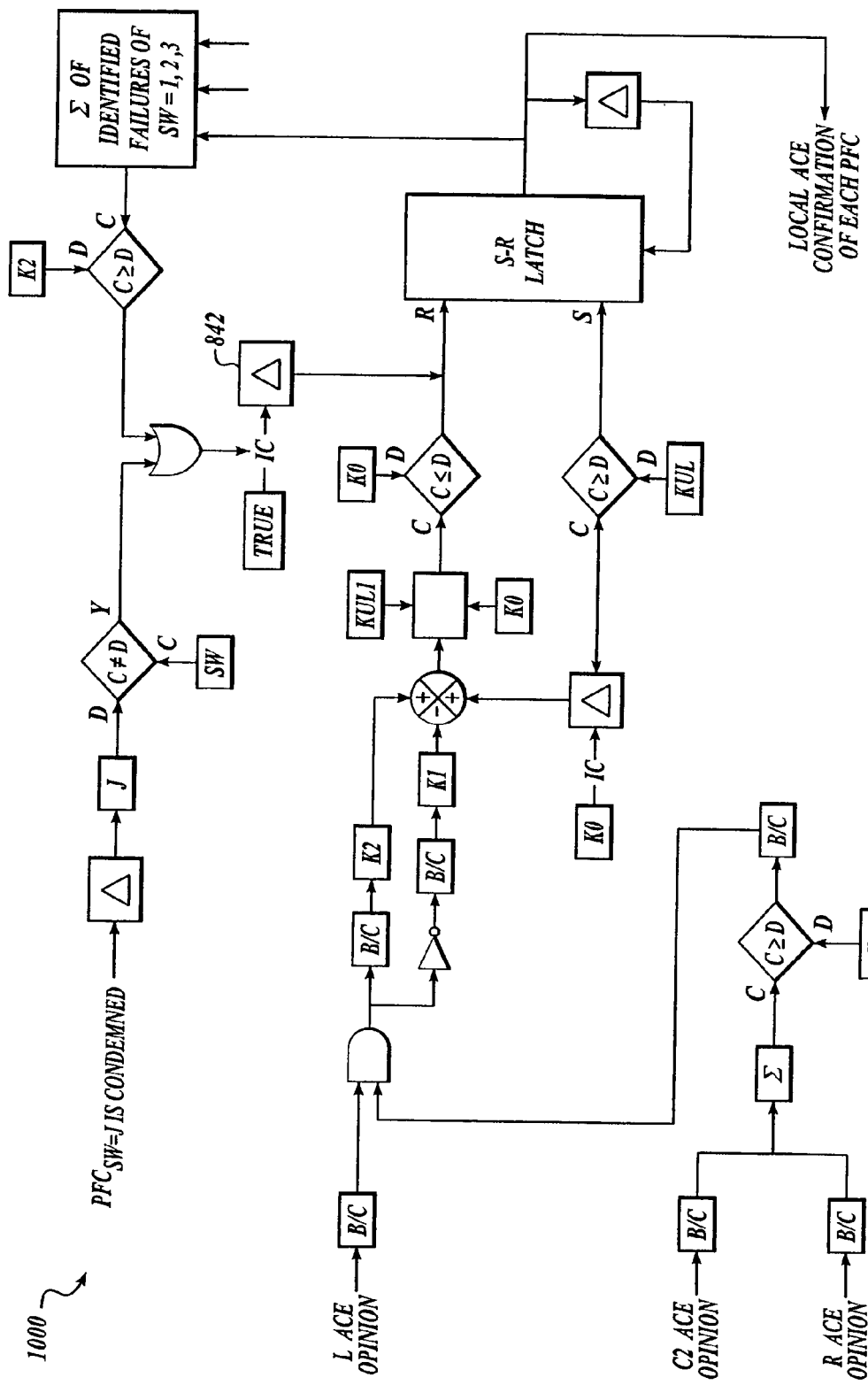
Figure 12:
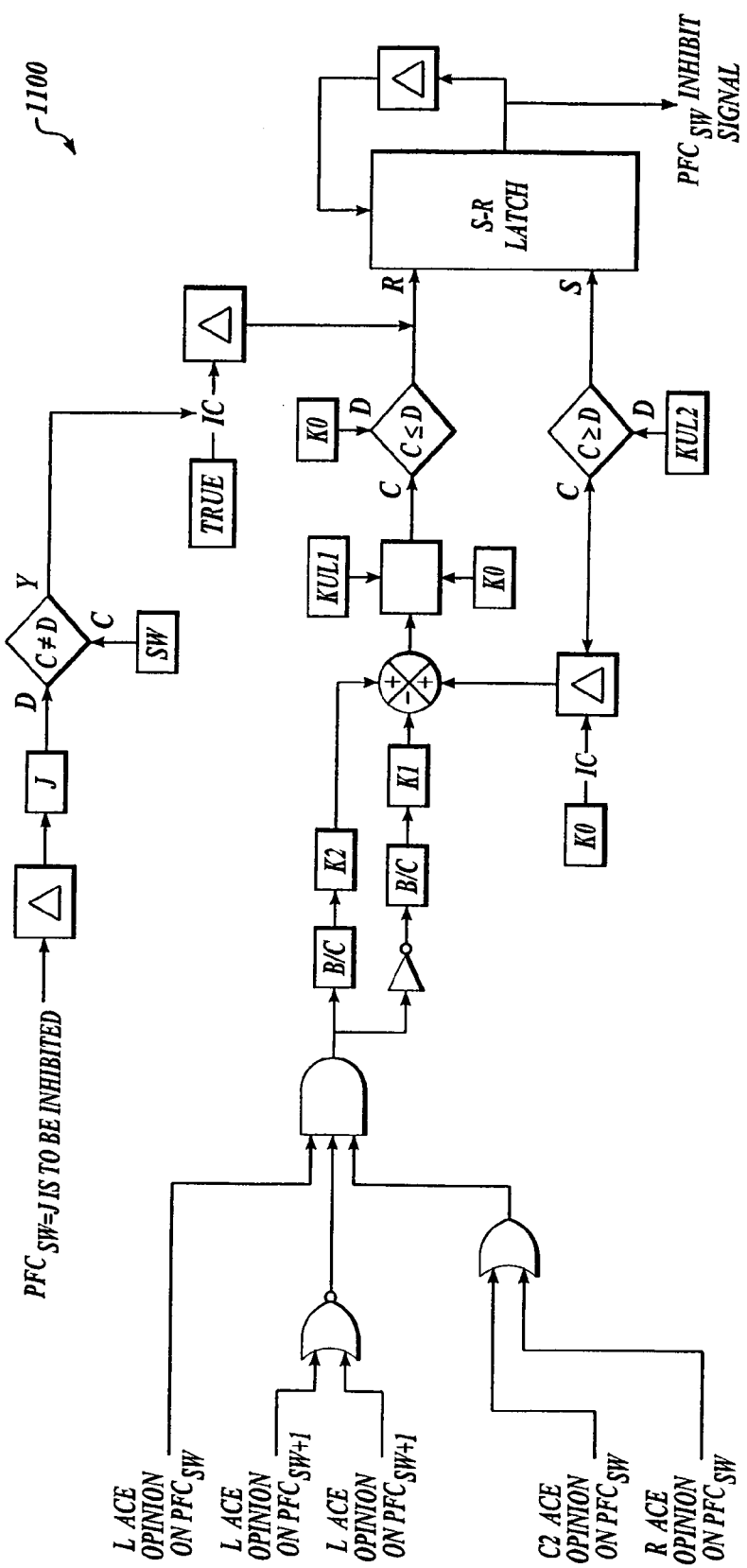

Referring to FIGS. 11 and 12, local ACE confirmation and global ACE consensus logic processes 1000 and 1100, respectively, are performed when the L ACE and C1 ACE are located in one cabinet and the C2 ACE and RACE are located in another cabinet. The local ACE confirmation process 1000 is similar to the local ACE confirmation process 800 (FIG. 9), except that at the beginning of the process 1000 the ACE within the same cabinet of the ACE that is doing the local ACE confirmation process 1000 is not used in the summation. Referring to FIG. 12, the opinion of the ACE in the same cabinet as the ACE that is doing the global ACE consensus process 1100 is not used in the OR gate of the other ACEs.

By way of overview of fly-by-wire systems, pilot commands are input through controllers, such as without limitation conventional control columns, wheels, rudder pedals, speed brake lever, or other fly-by-wire devices. Multiple position transducers are mounted on each controller for generating an analog command signal. The analog command signal is converted into a digital signal and transmitted to primary flight computers (PFCS) via redundant data buses, such as without limitation ARINC 629. The PFCs receive flight information, such as without limitation airplane inertial and air data, from supporting systems. The PFCs use the received data with the pilot produced digital signals to calculate control surface position commands. The calculated control surface position commands are then transmitted to respective equipment.

It will be appreciated that the present invention may be used in other system requiring redundant processing.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method comprising:
    generating synchronous digital control data at a pair of computer systems of a plurality of redundant pairs of computer systems, wherein the digital control data is one of discrete or continuous variable data;
    sending the generated synchronous digital control data to a plurality of line replaceable units;
    selecting the digital control data of one of the computer systems of the pair of the plurality of redundant pairs of computer systems;
    converting the selected digital control data into an analog signal;
    sending the analog signal to a corresponding actuator; and
    checking validity of each redundant pair of computer systems, wherein checking the validity includes:
        determining a freshness invalid signal; and determining if an error condition exists based on the corresponding digital control data and the freshness invalid signal, and wherein determining if an error condition exists includes:

if a difference between the digital control data of each computer system of a pair is greater than a threshold value, adding a first constant value to an error value;

if the difference between the digital control data from the computer systems of a pair is less than the first threshold value, subtracting a second constant value from the error value;

if the error value is greater than a second threshold value, indicating that an error condition exists with respect to the pair of computer systems; and if the error value is at least equal to a third threshold value, indicating that an error condition does not exist.

2. The method of claim 1, wherein determining if an error condition exists is repeated at a periodic rate.

3. The method of claim 1, further comprising disabling one or more of the redundant pairs of computer systems based on the determining if an error condition exists.

4. A system comprising:

means for generating synchronous digital control data at a pair of computer systems of a plurality of redundant pairs of computer systems, wherein the digital control data is one of discrete or continuous variable data;

means for sending the generated synchronous digital control data to a plurality of line replaceable units;

means for selecting the digital control data of one of the computer systems of the pair of the plurality of redundant pairs of computer systems;

means for converting the selected digital control data into an analog signal;

means for sending the analog signal to a corresponding actuator;

means for checking validity of each redundant pair of computer systems, wherein the means for checking the validity includes:

means for determining a freshness invalid signal; and means for determining if an error condition exists based on the corresponding digital control data and the freshness invalid signal, and wherein the means for determining if an error condition exists includes:

means for adding a first constant value to an error value, if a difference between the digital control data of each computer system of a pair is greater than a threshold value;

means for subtracting a second constant value from the error value, if the difference between the digital control data from the computer systems of a pair is less than the first threshold value;

means for indicating that an error condition exists with respect to the pair of computer systems, if the error value is greater than a second threshold value; and means for indicating that an error condition does not exist, if the error value is at least equal to a third threshold value.

5. The system of claim 4, wherein the means for determining if an error condition exists repeats at a periodic rate.

6. The system of claim 4, further comprising means for disabling one or more of the redundant pairs of computer systems based on the means for determining if an error condition exists.

* * * * *